United States Patent
Marchand et al.

(10) Patent No.: US 7,034,817 B2
(45) Date of Patent: Apr. 25, 2006

(54) METHOD AND DEVICE OF ALIGNMENT OF A VIDEO IMAGE WITH AN EDGE OF A DISPLAY SCREEN

(75) Inventors: Benoît Marchand, Grenoble (FR); Patrice Leurent, Saint Egreve (FR)

(73) Assignee: STMicroelectronics S.A., Montrouge (FR)

( * ) Notice: Subject to any disclaimer, the term of this patent is extended or adjusted under 35 U.S.C. 154(b) by 277 days.

(21) Appl. No.: 10/408,524

(22) Filed: Apr. 7, 2003

(65) Prior Publication Data

US 2003/0189561 A1 Oct. 9, 2003

(30) Foreign Application Priority Data

Apr. 9, 2002 (FR) .................................. 02 04418

(51) Int. Cl.
G09G 1/28 (2006.01)
G09G 5/00 (2006.01)
H04N 3/26 (2006.01)

(52) U.S. Cl. ............ 345/213; 315/368.12; 315/368.17; 348/326

(58) Field of Classification Search ............ 345/13–19, 345/208; 348/326–327; 315/368.12, 368.17

See application file for complete search history.

(56) References Cited

U.S. PATENT DOCUMENTS

| | | | | |
|---|---|---|---|---|
| 4,295,135 A | * | 10/1981 | Sukonick | 345/641 |
| 4,335,380 A | * | 6/1982 | Wright | 345/13 |
| 4,929,935 A | * | 5/1990 | Rysavy et al. | 345/178 |
| 5,041,764 A | * | 8/1991 | Midland et al. | 315/368.12 |
| 5,181,116 A | | 1/1993 | Nakagaki et al. | |
| 5,361,081 A | * | 11/1994 | Barnaby | 715/857 |
| 5,572,259 A | * | 11/1996 | Nohara | 348/441 |
| 6,023,133 A | * | 2/2000 | Leung et al. | 315/368.21 |
| 6,034,736 A | | 3/2000 | Chen | |
| 6,266,097 B1 | * | 7/2001 | Jiang et al. | 348/511 |

OTHER PUBLICATIONS

French Search Report from French Patent Application 02/04418, filed Apr. 9, 2002.

* cited by examiner

Primary Examiner—Xiao Wu
Assistant Examiner—M. Fatahiyar
(74) Attorney, Agent, or Firm—Lisa K. Jorgenson; James H. Morris; Wolf, Greenfield & Sacks, P.C.

(57) ABSTRACT

The aligning a video image with an edge of a display screen, the video image being displayed by a scanning of lines of the display screen by at least one electron beam modulated by a modulation signal, including, for each scanned line of the screen, storing successive digital video data in a storage device; detecting the end of the scanning of the line preceding the scanned line; initiating a delay upon detection of the end of the scanning of the line preceding the scanned line; starting the reading, from the storage device, of the successive digital video data stored at the end of the delay; and providing the modulation signal based on the read successive digital video data.

8 Claims, 2 Drawing Sheets

METHOD AND DEVICE OF ALIGNMENT OF A VIDEO IMAGE WITH AN EDGE OF A DISPLAY SCREEN

BACKGROUND OF THE INVENTION

1. Field of the Invention

The present invention relates to a method and a device for aligning a video image with an edge of a display screen.

2. Discussion of the Related Art

Generally, a video image is displayed on a display screen of a display terminal by exciting phosphors arranged on the screen by means of one or several electron beams, emitted by electron guns. In the case of a color screen, a cathode-ray tube with three electron beams, each exciting a type of phosphor respectively emitting a red, green, or blue light, is generally used. The electron beams are modulated in intensity by modulation signals representative of the image to be displayed on the screen.

Generally, the electron beams are focused at one point of the screen and are deviated together to scan screen lines. The electron beams scan the screen lines from the right to the left of the screen, returning to the left of the screen after the scanning of each line. The screen scanning is performed from the upper horizontal edge to the lower horizontal edge.

The electron beam deviations are obtained by two deflection coils, one horizontal deflection coil which controls the scanning of each screen line, and one vertical deflection coil which controls the deviations of the electron beams in the vertical direction.

FIG. 1 shows a conventional example of a timing diagram of current I supplying the horizontal deflection coil. For clarity, the timing diagram is not shown to scale. Curve 10, representative of current I, comprises linear ascending ramps 11 linked by descending portions 12. Each ascending ramp 11 corresponds to the scanning, by the electron beams, of a line from the left to the right of the screen. Each descending portion 12 corresponds to the return of the electron beams to the left of the screen.

FIG. 2 shows timing diagrams of signals implemented to form ramps 11 of current I and to display an image on the screen.

From the image signal received by the display terminal, is extracted a square signal $H_{SYNC}$, represented by curve 15, from which are generated the different clock signals synchronizing the elements of the display terminal. Blocks of video signals VIDEO, shown as blocks 16A, 16B of curve 16, each block 16A, 16B comprising the video data necessary for the display of an image line, are also extracted from the image. Each video block 16A, 16B is transmitted to a modulation system to generate the signals for modulating the intensity of the electron beams.

A rising edge of signal $H_{SYNC}$ indicates the beginning of the display of a line. Duration $\Delta$TVIDEO separating one rising edge of signal $H_{SYNC}$ from the beginning of the transmission of a video block 16A, 16B is constant.

The stopping of an ascending ramp 11 is controlled by the rising edge of a signal $H_{OUT}$, represented by curve 17. Signal $H_{OUT}$ is provided by a device for controlling the display terminal based on signal $H_{SYNC}$. Signal $H_{OUT}$ is, for example, a square pulse signal, each rising edge of which, separated by a duration $\Delta TH_{OUT}$ from the preceding rising edge of signal $H_{SYNC}$, corresponds to the end of an ascending ramp.

The display frequency of the lines on a screen is generally high, for example, on the order of some thirty kilohertz, whereby the implementation of ascending ramps 11 of current I supplying the horizontal deflection coil must be performed directly at the level of the power stage of the horizontal deflection coil by discrete components. The control device transmits signal $H_{OUT}$ to the power stage of the horizontal deflection coil to control the end of each ascending ramp 11. The power stage transmits in return to the control device a signal $H_{FLY}$, represented by curve 18, each pulse of which indicates a descending part 12 of the supply current of the horizontal deflection coil, that is, the return of the electron beams to the left of the screen.

Response times $t_S$ of the power stage components may be variable. There may thus appear a variable duration between the reception of signal $H_{OUT}$ by the power stage and the end of the associated ascending ramp 11. Now, it is necessary to ensure a constant duration $\Delta$TVID between signal $H_{FLY}$ and the beginning of the transmission of the next video data block 16A, 16B so that the pixel display on a screen line starts at a substantially constant distance from the screen edge.

FIG. 3 shows in the form of a block diagram a conventional control device 20 implementing a regulation of duration $\Delta$TVID between signal $H_{FLY}$ and the beginning of the transmission of the next video data block 16A, 16B.

Control device 20 receives as inputs signal $H_{SYNC}$ and signal $H_{FLY}$. Signal $H_{SYNC}$ is transmitted to a counter 22 which, after a variable delay $\Delta TH_{OUT}$, transmits signal $H_{SYNC}$ to a calculation unit (SYNT.) 24 which provides signal $H_{OUT}$. Control device 20 also comprises a comparator 26, which determines duration $\Delta TH_{FLY}$ separating the reception of a rising edge of signal $H_{SYNC}$ and of the next signal $H_{FLY}$, compares the measured duration with a reference duration $\Delta$TREF, and accordingly provides an error signal to a correction unit 28. Correction unit 28 transmits to counter 22 a new duration $\Delta TH_{OUT}$ to be used to correct the position of the next pulse $H_{OUT}$ to obtain a better position of the next signal $H_{FLY}$.

The correction performed on duration $\Delta TH_{OUT}$ will affect the next signal $H_{OUT}$ transmitted after signal $H_{SYNC}$. Thereby, the ascending ramp 11 which immediately follows the signal $H_{FLY}$ from which the correction has been determined, is not corrected, since it originates from an already-transmitted signal $H_{OUT}$. The video block immediately following signal $H_{SYNC}$ may thus not be correctly synchronized with ascending ramp 11. The line of the video image associated with the video block may be displayed in a shifted manner with respect to the screen edge while the next line of the video image will be properly displayed.

SUMMARY OF THE INVENTION

The present invention aims at providing a device and a method for displaying lines of a video image enabling immediate synchronization of the screen scanning and of the displaying of an image.

For this purpose, the invention provides a method for aligning a video image with an edge of a display screen, the video image being displayed by a scanning of lines of the display screen by at least one electron beam modulated by a modulation signal, comprising the steps of, for each scanned line of the screen, storing successive digital video data in a storage means; detecting the end of the scanning of the line preceding the scanned line; initiating a delay upon detection of the end of the scanning of the line preceding the scanned line; starting the reading, from the storage means, of the successive digital video data stored at the end of the delay; and providing the modulation signal based on the read successive digital video data.

According to another object of the present invention, the determined delay is identical for all the scanned lines.

According to another object of the present invention, the electron beam is deviated by a horizontal deflection coil receiving, for the scanning of each line, a linear current ramp.

According to another object of the present invention, each of the digital video data corresponds to an intensity of a color component of a pixel to be displayed on screen.

The present invention also provides a device for aligning a video image with an edge of a display screen, the video image being displayed by a scanning of lines of the display screen by at least one electron beam emitted by an electron gun and modulated by a modulation signal, comprising a means for storing successive digital video data; a counter receiving a signal representative of the end of the scanning of a line and transmitting said representative signal after a determined delay; a means for providing a read start control signal based on the representative signal transmitted by the counter; a means for reading from the means for storing the successive digital video data upon reception of the read start control signal; and a means for providing the modulation signal based on the read successive digital video data.

According to another object of the present invention, the storage means is of first-in-first-out type.

According to another object of the present invention, the device further comprises a means for receiving an image signal transmitted from the outside of the device; a means for providing a synchronization signal based on the image signal; and a means for providing a control signal of the beginning of the scanning of a screen line based on the synchronization signal.

According to another object of the present invention, the synchronization signal is a substantially periodic square pulse signal, the control signal being provided upon each rising edge of the synchronization signal.

The foregoing objects, features, and advantages of the present invention, will be discussed in detail in the following non-limiting description of specific embodiments in connection with the accompanying drawings.

DETAILED DESCRIPTION

Figure 1:
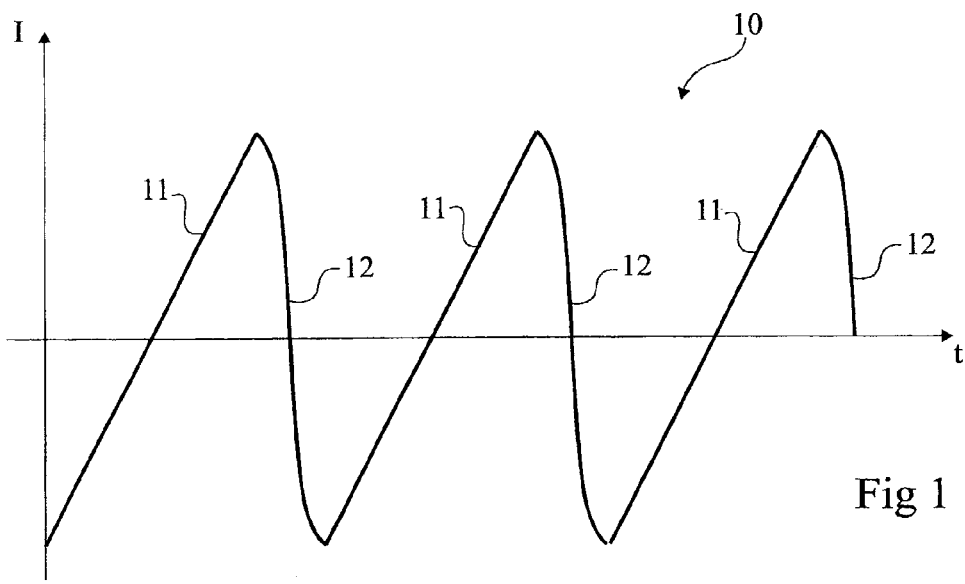
FIG. 1, previously described, shows a timing diagram of the current supplying a horizontal deflection coil of a display terminal.

In the following description, reference numerals identical to those previously used will be used to designate signals performing identical functions.

Figure 4:
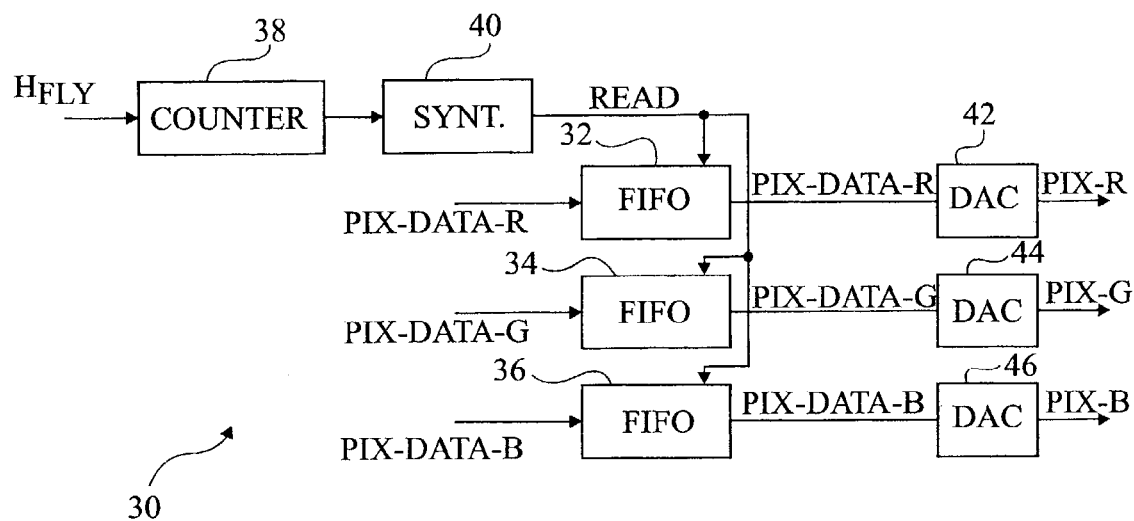
FIG. 4 shows in the form of a block diagram an example of embodiment of a control device according to the present invention for synchronizing the display of a video image and the screen scanning.

FIG. 4 shows an example of implementation of a control device 30 according to the present invention equipping a display terminal. As previously described, control device 30 receives signals $H_{SYNC}$ and $H_{FLY}$ and outputs signal $H_{OUT}$ which controls the end of the ascending ramps of the supply current of the horizontal deflection coil of the display terminal.

Control device 30 also receives digital pixel data PIX_DATA_R, PIX_DATA_G, PIX_DATA_B, which are determined from the image signal received by the display terminal. As an example, each of the digital pixel data PIX_DATA_R, PIX_DATA_G, PIX_DATA_B is representative of an intensity value of a red, green, or blue component of a pixel of the image to be displayed.

Device 30 according to the present invention comprises three memories 32, 34, 36 of FIFO-type. The digital pixel data PIX_DATA_R, PIX_DATA_G, PIX_DATA_B are respectively and successively stored in each memory 32, 34, 36.

Device 30 according to the present invention comprises a counter 38 which receives as an input signal $H_{FLY}$, or a signal resulting from a pre-processing of signal $H_{FLY}$, indicating the end of an ascending ramp of the supply current of the horizontal deflection coil. Counter 38 transmits signal $H_{FLY}$ to a calculation unit (SYNT.) 40 after a fixed delay $\Delta TVID'$ has elapsed. Calculation unit 40 determines from signal $H_{FLY}$ a read start control signal READ, which is, for example, a square signal.

At the rising edge of signal READ, each memory 32, 34, 36 successively transmits to a digital-to-analog converter (DAC) 42, 44, 46 pixel data PIX_DATA_R, PIX_DATA_G, PIX_DATA_B. Duration $\Delta TVID'$ then represents the duration separating signal $H_{FLY}$ from the beginning of the transmission of pixel data PIX_DATA_R, PIX_DATA_G, PIX_DATA_B to converters 42, 44, 46. Converters 42, 44, 46 convert the read digital pixel data PIX_DATA_R, PIX_DATA_G, PIX_DATA_B into analog signals PIX_R, PIX_G, PIX_B. Analog signals PIX_R, PIX_G, PIX_B are then transmitted to the modulation system of the display terminal which determines, based on analog signals PIX_R, PIX_G, PIX_B the signals of modulation of electron beam intensity.

Control device 30 also comprises a counter 48 which receives signal $H_{SYNC}$. Counter 48 transmits, after a fixed delay $\Delta H_{OUT}'$ has elapsed, signal $H_{SYNC}$ to a calculation unit 50 which provides signal $H_{OUT}$.

Figure 2:
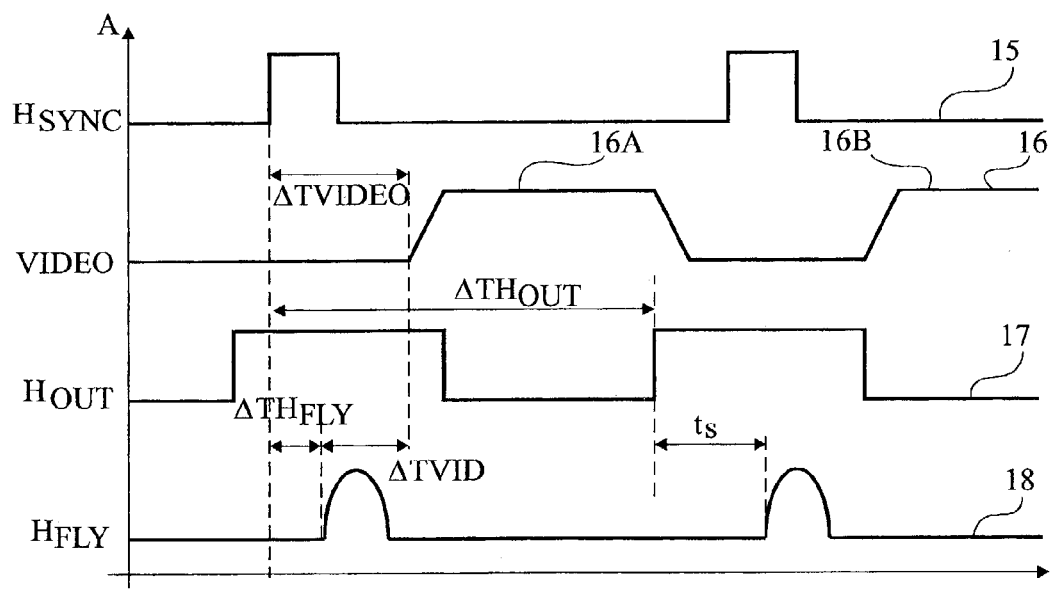
FIG. 2, previously described, shows timing diagrams of control signals for the display of a video image.
Figure 3:
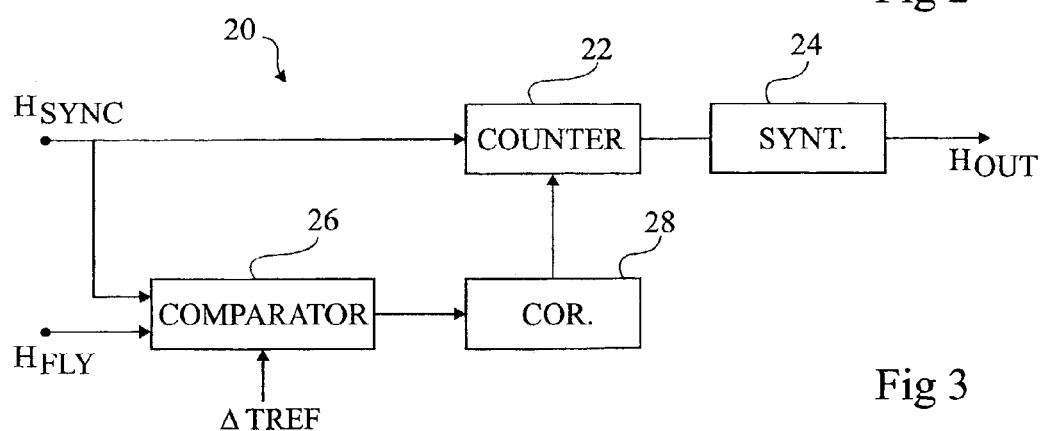
FIG. 3, previously-described, shows in the form of a block diagram a conventional control device for synchronizing the display of a video image and the screen scanning.
Figure 5:
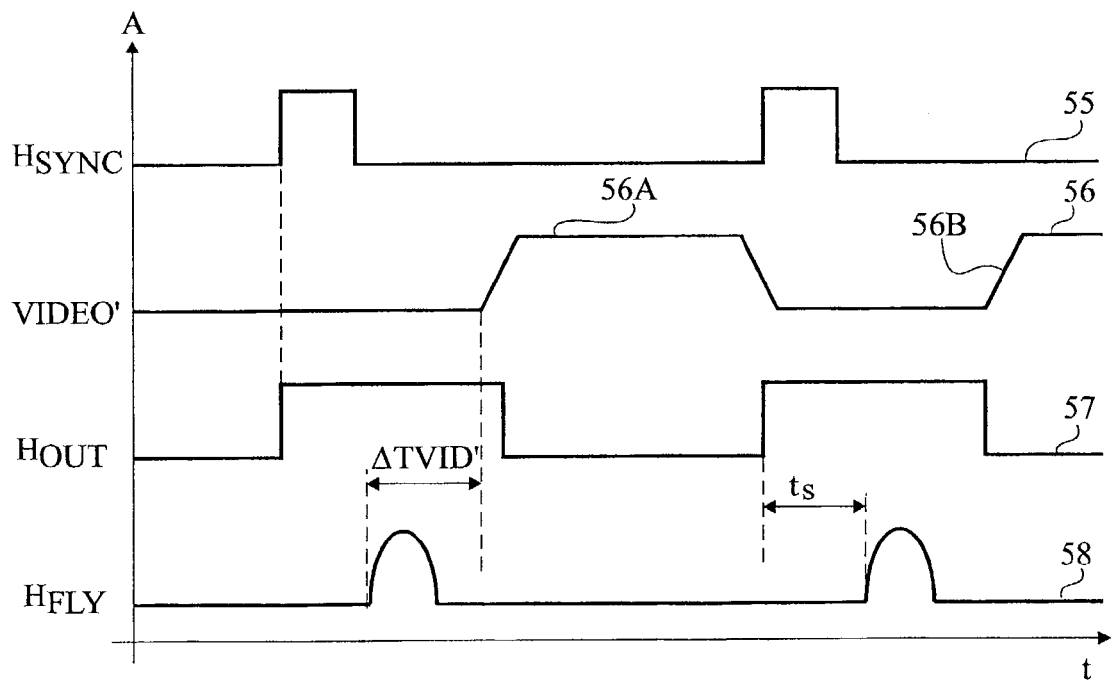
FIG. 5 shows the timing diagrams of the signals of FIG. 2 obtained from the device of FIG. 4.

FIG. 5 shows timing diagrams of the signals of FIG. 2 with device 30 of FIG. 4. Curve 55 represents signal $H_{SYNC}$, curve 56 represents video blocks 56A, 56B of a signal VIDEO' transmitted to the electron beam modulation system, that is, any one of signals PIX_R, PIX_G, or PIX_B, curve 57 represents signal $H_{OUT}$ and curve 58 represents signal $H_{FLY}$.

In FIG. 5, the rising edge of signal $H_{OUT}$ is simultaneous with the rising edge of signal $H_{SYNC}$. This corresponds to a delay $\Delta TH_{OUT}'$ set to zero. Counter 48 can, in this case, be eliminated.

Control device 30 according to the present invention enables controlling the time of the beginning of the transmission of video blocks to the modulation system. Such a time is modified according to signal $H_{FLY}$ so that the duration between signal $H_{FLY}$ and the beginning of the transmission of the video data blocks remains constant. It is thus ensured that for each line, the image line is displayed at a fixed distance from the left side of the screen.

The present invention has many advantages.

First, as compared to a conventional control device, the device according to the present invention performs a particularly simple open-loop regulation.

Second, the present invention enables synchronizing in real time the transmission of video data to the modulation system with the scanning of a line. Even if an ascending ramp of the supply current of the horizontal deflection coil is offset in time and/or has a duration longer or shorter than a reference duration, the pixels of the next image line will be correctly displayed. Indeed, the video blocks, corresponding to the pixels to be displayed, are only transmitted to the modulation system after a fixed duration following the reception of signal $H_{FLY}$ indicating the end of the preceding ramp, and thus independently from the ramp duration.

Third, the present invention enables getting rid of the constraints linked to variations $t_S$ between signal $H_{OUT}$ and signal $H_{FLY}$. Indeed, it is the time of the beginning of the video block transmission which is directly controlled, and no longer the time when control signal $H_{OUT}$ is transmitted.

Of course, the present invention is likely to have various alterations, modifications, and improvements which will readily occur to those skilled in the art. In particular, the present invention may apply to display terminals of computer monitor type, automatic teller machine screen, etc.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for aligning a video image with an edge of a display screen, the video image being displayed by a scanning of lines of the display screen by at least one electron beam modulated by a modulation signal, comprising, for each scanned line of the screen:
   storing successive digital video data in a storage means;
   detecting an end of a scanning of a line preceding the scanned line;
   initiating a delay upon detection of the end of the scanning of the line preceding the scanned line;
   starting a reading, from the storage means, of the successive digital video data stored at the end of the delay; and
   providing the modulation signal based on the read successive digital video data.

2. The method of claim 1, wherein the determined delay is identical for all the scanned lines.

3. The method of claim 1, wherein the electron beam is deviated by a horizontal deflection coil receiving, for the scanning of each line, a linear current ramp.

4. The method of claim 1, wherein each of the digital video data corresponds to an intensity of a color component of a pixel to be displayed on screen.

5. A device for aligning a video image with an edge of a display screen, the video image being displayed by a scanning of lines of the display screen by at least one electron beam emitted by an electron gun and modulated by a modulation signal, comprising:
   means (32, 34, 36) for storing successive digital video data;
   a counter receiving a signal representative of an end of the scanning of a line and transmitting said representative signal after a determined delay;
   means for providing a read start control signal based on the representative signal transmitted by the counter;
   means for reading from the means for storing the successive digital video data upon reception of the read start control signal; and
   means for providing the modulation signal based on the read successive digital video data.

6. The device of claim 5, wherein the storage means is of first-in-first-out type.

7. The device of claim 5, further comprising:
   means for receiving an image signal transmitted from the outside of the device;
   means for providing a synchronization signal based on the image signal; and
   means for providing a control signal of the beginning of the scanning of a screen line based on the synchronization signal.

8. The device of claim 7, wherein the synchronization signal is a substantially periodic square pulse signal, the control signal being provided upon each rising edge of the synchronization signal.

* * * * *

UNITED STATES PATENT AND TRADEMARK OFFICE
CERTIFICATE OF CORRECTION

PATENT NO. : 7,034,817 B2 Page 1 of 1
APPLICATION NO. : 10/408524
DATED : April 25, 2006
INVENTOR(S) : Benoît Marchand and Patrice Leurent It is certified that error appears in the above-identified patent and that said Letters Patent is hereby corrected as shown below:

Claim 5, col. 6, line 14 should read:
means for storing successive digital video Signed and Sealed this Sixth Day of November, 2007

JON W. DUDAS
*Director of the United States Patent and Trademark Office*